(12) United States Patent
Gong et al.

(10) Patent No.: US 8,847,947 B2
(45) Date of Patent: Sep. 30, 2014

(54) AUTOMATIC TOLERANCING OF GEOMETRICAL TEMPLATES

(75) Inventors: Zhi Yuan Gong, Saint Cyr l'Ecole (FR); Christophe Naveau, Nanterre (FR); Luc Bernard Robert Hernandez, Maisons-Laffitte (FR); Dominique Guy Gaunet, Limeil Brevannes (FR)

(73) Assignee: Dassault Systemes, Velizy Villacoublay (FR)

( * ) Notice: Subject to any disclaimer, the term of this patent is extended or adjusted under 35 U.S.C. 154(b) by 202 days.

(21) Appl. No.: 12/948,465

(22) Filed: Nov. 17, 2010

(65) Prior Publication Data
US 2012/0120052 A1 May 17, 2012

(51) Int. Cl.
G06T 15/00 (2011.01)
G06F 17/50 (2006.01)
G06F 19/00 (2011.01)
G06T 19/00 (2011.01)

(52) U.S. Cl.
CPC ........... G06T 19/00 (2013.01); *G06T 2219/012* (2013.01); *Y10S 715/964* (2013.01)
USPC .................. 345/419; 715/964; 703/1; 700/98

(58) Field of Classification Search
CPC ...... G06F 17/50; G06T 19/00; G06K 19/086; G06K 9/00093; G06K 19/18
USPC ......................................................... 345/419
See application file for complete search history.

(56) References Cited

U.S. PATENT DOCUMENTS

| | | | |
|---|---|---|---|
| 6,611,725 B1 * | 8/2003 | Harrison et al. | 700/98 |
| 7,155,375 B1 * | 12/2006 | Rimoldi et al. | 703/2 |
| 7,275,023 B2 * | 9/2007 | Chen et al. | 703/2 |
| 2003/0204823 A1 * | 10/2003 | Armstrong et al. | 716/2 |
| 2005/0225551 A1 * | 10/2005 | Shimizu et al. | 345/419 |
| 2008/0126019 A1 * | 5/2008 | Lanzarotta et al. | 703/1 |
| 2010/0076563 A1 * | 3/2010 | Otto et al. | 623/20.14 |

* cited by examiner

*Primary Examiner* — Kee M Tung
*Assistant Examiner* — Haixia Du
(74) *Attorney, Agent, or Firm* — Oblon, Spivak, McClelland, Maier & Neustadt, L.L.P.

(57) ABSTRACT

A system for tolerancing geometrical templates upgrades the geometrical template to include a unique identifier and index corresponding to each sub-feature of the template. The upgraded template is associated to a set of 3D annotations and the association is stored in a catalog which uses the unique identifier as an index. Upon instantiation of the geometrical template, a list of corresponding tolerance templates are retrieved and displayed for selection, and a selected tolerance template is then instantiated onto the geometrical template.

30 Claims, 10 Drawing Sheets

AUTOMATIC TOLERANCING OF GEOMETRICAL TEMPLATES

FIELD

The present advancements relate to a computer aided design (CAD) system and associated methodology for adding tolerance annotations to geometrical templates used in three-dimensional modeling of objects.

BACKGROUND

In industry, CAD systems are used to aid in the design of an object by allowing designers to visualize and to validate the object before it is physically created. In this way, a designer can determine whether an object is suitable for its intended application, and make any necessary refinements, without resorting to the expense of configuring equipment, making dies and acquiring raw materials to actually make the object. As part of the process of three-dimensionally modeling the object, dimensions, geometrical tolerances, notes and symbols (referred to herein as 3D annotations) are added to the modeled object based upon the intended application, as well as the capabilities of the equipment that will fabricate the object.

Many objects share similar geometrical features, allowing designers to develop geometrical templates that can be reused for common features. These templates are stored in libraries and allow designers to avoid remodeling the geometrical features from scratch. Thus, once a particular geometrical feature has been created it can be reused in many different designs, or be used as a basis from which to design a variant of the geometrical feature, reducing the amount of time spent creating the basic building blocks used to model the object.

However, even when a particular geometrical feature is available for reuse as a template, a designer using a conventional CAD system must instantiate the geometrical feature and then manually add 3D annotations to sub-features of the geometrical feature. For example, if the designer instantiates a template for a countersink hole, the designer must then manually define the 3D annotations for the diameter and depth of the hole, as well as the depth and interior angle of the countersink. Therefore, at least part of the efficiency gained by reusing the geometrical feature is lost to manual entry of the 3D annotations.

One conventional solution is to collect common 3D annotations in a library from which the designer can draw when creating the three-dimensional model of the object. The 3D annotations in the library are then reused much like the geometrical templates. However, a user still has to manually connect each 3D annotation to the corresponding geometries to which the 3D annotation applies. The number of 3D annotations can be extensive, and a designer is unlikely to remember all of the geometries to which a 3D annotation applies. Therefore, even when using a library of 3D annotations, applying the 3D annotations to a three-dimensionally modeled object still involves time-consuming and inefficient manual input from the designer.

Accordingly, a need exists for a system and associated methodology of applying 3D annotations to a geometrical feature of a three-dimensional model of an object without requiring the time-consuming manual entry of the conventional methods described above.

SUMMARY

A computer aided design station for designing and tolerancing a modeled object includes a display to display the modeled object and an interface to receive a user input relating to the modeled object. A processor selects a geometrical feature of the modeled object based on the user input, and searches in a catalog for tolerance scheme templates corresponding to the geometrical feature. The processor also displays, on the display, tolerance scheme templates that correspond to the geometrical feature, and selects a tolerance scheme template from those displayed based on the user input. The processor then applies the selected tolerance scheme template to the geometrical feature of the modeled object.

In another aspect, a computer aided design station for creating a catalog of tolerance scheme templates that correspond to geometrical templates used in designs of modeled objects includes an electronic memory that stores the geometrical templates and the catalog of tolerance scheme templates. A display displays the geometric templates, and an interface receives a user input. A processor then selects a geometrical template displayed on the display based on the user input, and associates a tolerance scheme template with the selected geometrical template.

BRIEF DESCRIPTION OF THE DRAWINGS

A more complete appreciation of the embodiments described herein, and many of the attendant advantages thereof, will be readily obtained as the same becomes better understood by reference to the following detailed description when considered in connection with the accompanying drawings, wherein.

DETAILED DESCRIPTION

Figure 1:
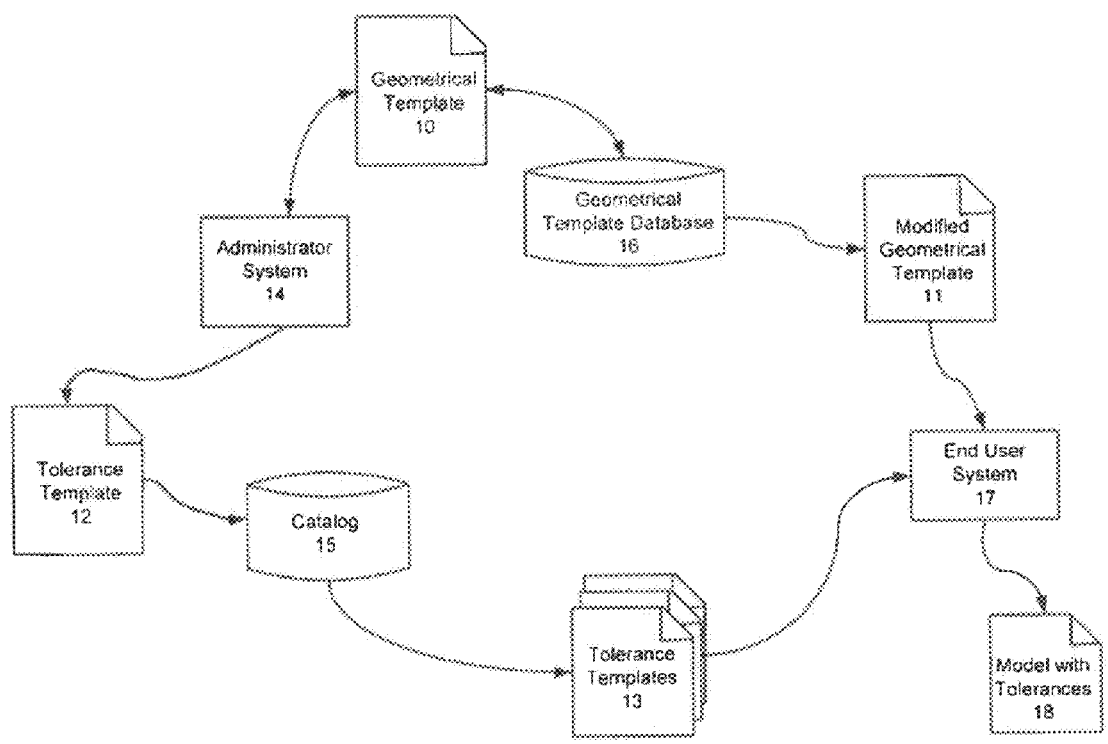
FIG. 1 is a schematic diagram of tolerancing a geometrical template according to an exemplary embodiment of the present advancements.

Referring now to the drawings, wherein like reference numerals designate identical or corresponding parts throughout the several views, the claimed advancements relate to a system and associated methodology for tolerancing geometrical templates used in three-dimensional modeling of objects. Specifically, an administrator system upgrades a geometrical template by creating a universal unique identifier (UUID), which characterizes the geometrical template and copying the UUID to each sub-feature, such as a face, edge and/or vertex of the geometrical template, along with an index corresponding to sub-feature. This creates a reference to each sub-feature in the geometrical template. The administrator system then creates a tolerance scheme template including a set of 3D annotations linked to sub-features of the geometrical template using the UUID and indices. The tolerance scheme template is saved in a catalog in association with the UUID and index of each sub-feature of the geometrical template, and the catalog can then be searched using the UUID to find tolerance scheme templates matching the geometrical template.

When an end user system instantiates the geometrical template as part of a three-dimensional model of an object, the UUID and indices of the sub-features for the geometrical template are copied onto the instantiated geometrical feature. One or more tolerance scheme templates corresponding to the UUID are then displayed on the display of the end user system, and one of the displayed tolerance scheme templates is selected for application onto the instantiated geometrical template.

As can be appreciated, each geometrical template can have any number of tolerance scheme templates associated therewith. The 3D annotations in the tolerance scheme templates can include dimensions, geometrical tolerances, notes, texts or symbols which are defined by international standards (ISO, ASME, ANSI, JIS, DIN, etc.) Therefore, as one of ordinary skill in the art would recognize, the information included in the 3D annotations in no way limits the scope of the present advancements.

Further the UUID can be a hexadecimal number generated from a random number and computer characteristics. However, the UUID number can be computed in any manner without departing from the scope of the present advancements as long as the resulting UUID is unique.

FIG. 1 is a diagram of tolerancing a geometrical template according to exemplary embodiments of the present advancement. In FIG. 1, the administrator system 14 receives a geometrical template 10 from, for example, a geometrical template database 16. The administrator system 14 then creates a tolerance scheme template 12 based on the geometrical template 10, and stores the tolerance scheme template in catalog 15.

Specifically, the administrator system 14 upgrades the geometrical template 10 by adding a UUID and indices to the geometrical template 10 as discussed in detail below. The administrator system 14 then creates the 3D annotations for the tolerance scheme template 12 and associates them with the geometrical template 10 using the UUID and indices, and stores the association in the tolerance scheme template 12, before storing the tolerance scheme template in catalog 15. A tolerance scheme template 12 is therefore an object that stores both the UUID and an aggregate of 3D annotations. The 3D annotations include indices for sub-features of the upgraded geometrical template 10.

As can be appreciated, catalog 15 can store only the associations between the tolerance scheme templates 12 and the geometrical templates 10, or can store both the association and the tolerance scheme templates 12 themselves. In addition the catalog 15 and geometrical database 16 can be physically separate or can reside within a same storage device.

Catalog 15 and geometrical template database 16 can also be distributed among several storage devices. As such, the associations, the tolerance scheme templates and the geometrical templates can be stored in any manner that is known without departing from the scope of the present advancements.

Returning to FIG. 1, the administrator system 14 also stores the modified, or upgraded, geometrical template 10 in the geometrical template database 16 where they can be retrieved by an end user system 17. The end user system 17 retrieves a modified geometrical template 11 from the geometrical template database 16 when designing a three-dimensional model of an object and instantiates the geometrical template as part of the object. Based upon the UUID of the upgraded geometrical template 11, the end user system 17 queries the catalog 15 to determine any and all tolerance scheme templates 13, which are associated with the upgraded geometrical template 11. As discussed in detail below, the end user system 17 then selects one of the tolerance scheme templates 13 and instantiates the same onto the upgraded geometrical template 11 to create the three-dimensional model 18 with 3D annotations.

As can be appreciated, the administrator system 14 and end user system 17 can both reside within a single physical system or can be two separate physical systems, and can even be separated by a network, such as the Internet. Further, one or more of the geometrical template database 16 and catalog 15 can reside within the administrator system 14, or the end user system 17, or can be physically separate from both the administrator system 14 and the end user system 17. As such, FIG. 1 is merely exemplary and in no way limits the scope of the present advancements.

Figure 2:
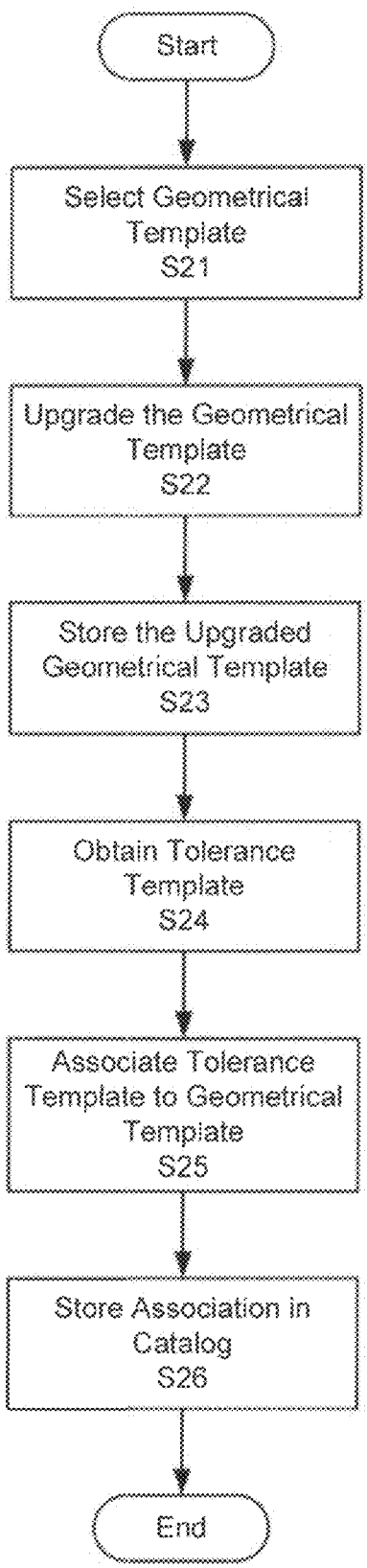
FIG. 2 is an algorithmic flowchart overview of creating a tolerance scheme template for a geometrical template according to an exemplary embodiment of the present advancements.

Next a process of associating a tolerance scheme template 12 with a geometrical template 10 is described with reference to FIG. 2. In FIG. 2, a geometrical template is selected from, for example, the geometrical template database 16 at step S21. Selection of the geometrical template 10 can be directly performed by a user of the administrator system 14, or can be automated in a batch process to facilitate upgrade of a plurality of geometrical templates 10 and association with corresponding tolerance scheme templates 12.

At step S22, the geometrical template 10 is upgraded by adding the UUID and indices as discussed below in detail. Then the upgraded, or modified, geometrical template 10 is stored in the geometrical template database 16 at step S23. At step S24, a tolerance scheme template 12 is created by the administrator system 14.

As can be appreciated, the tolerance scheme template 12 can be obtained from a database of existing tolerance scheme templates, or can generated directly. The tolerance scheme template can also be extracted from 3D annotations on an existing three-dimensional modeled object. As such, the tolerance scheme templates can be obtained from any source without departing from the scope of the present advancements.

At step S25, the administrator system 14 associates the 3D annotations within the tolerance scheme template 12 with each sub-feature in the geometrical template 10 using the UUID and an index corresponding to the sub-feature. This associated tolerance scheme template is then stored in the catalog 15, where the UUID serves as a search index.

Figure 3:
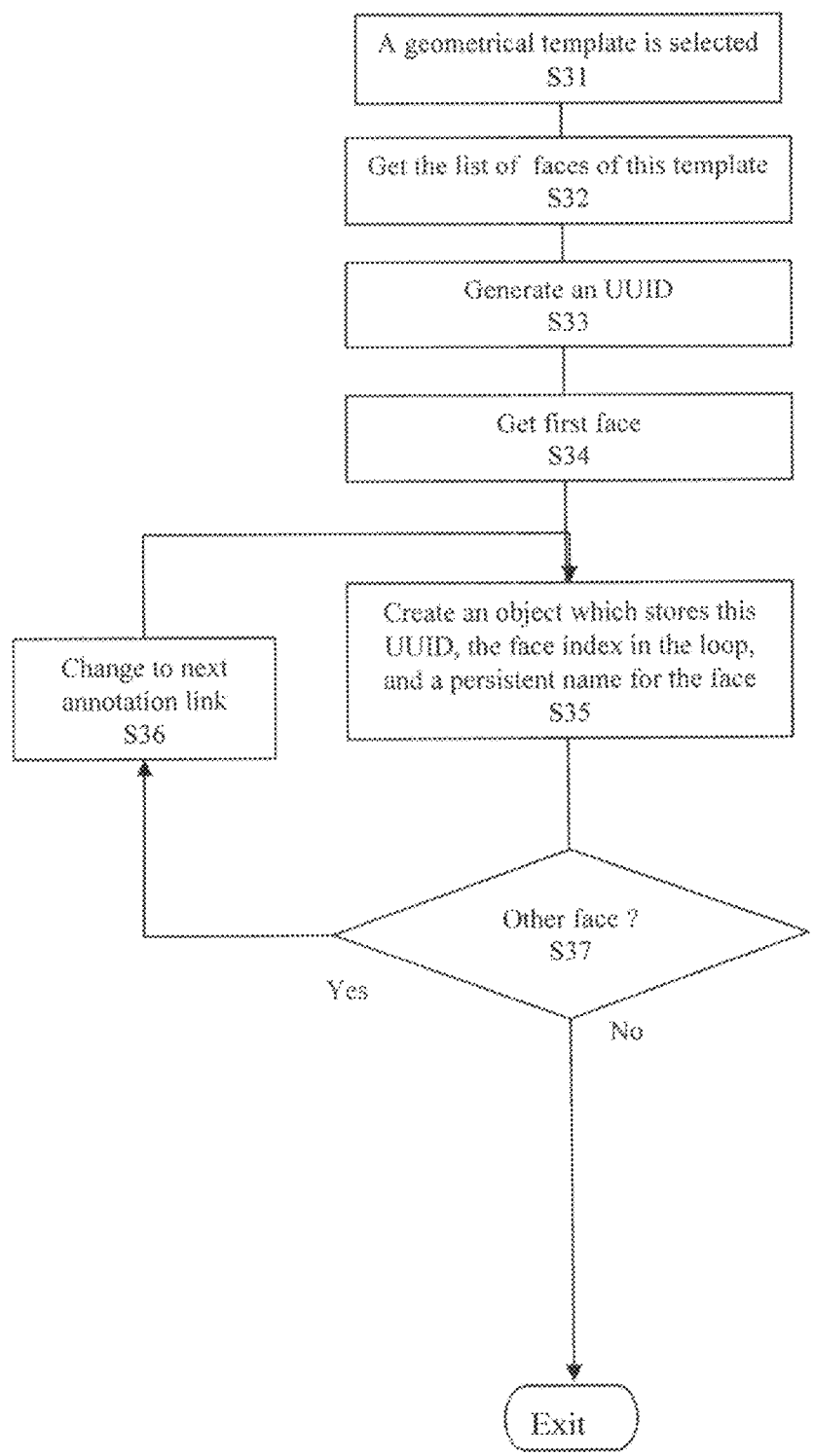
FIG. 3 is an algorithmic flowchart of updating geometrical templates according to exemplary embodiments of the present advancements.

FIG. 3 is a flowchart of geometrical template upgrading according to an exemplary embodiment of the present advancement. In FIG. 3, a geometrical template 10 is selected at step S31 as described above. At step S32, a list of faces for the selected geometrical template is obtained. As used herein, a "face" is a sub-feature of the geometrical template. Specifically, a face is a topological cell with a surface (cylinder, plane, cone, etc.) as support geometry and is bounded by edges and vertices.

At step S33, a universal unique identifier (UUID) is generated for the geometrical template 10. Step S34 begins a recursive process in which a face, or sub-feature is selected. At step S35, the selected sub-feature is assigned an index and name and an object storing the face and index of the sub-feature in association with the UUID of the geometrical template is created. At step S37, the process determines whether additional faces remain for processing. If there are no more faces to process, the process of upgrading the geometrical template ends. However, if more faces remain for processing, the process continues to step S36 in which the next face is selected for indexing and naming as described above.

Though the above process of upgrading geometrical templates is described serially, the process can also be performed in parallel, or can be distributed among several administrator systems 14 or other computing devices. The process of upgrading the geometrical templates 10 can also be performed as the geometrical templates are selected for instantiation in a three-dimensional model of an object, can be performed as the geometrical templates are added to the geometrical template database 16 or can be performed as part of a separate task to associate geometrical templates to tolerance scheme templates. Therefore, the process described above with reference to FIG. 3 is merely exemplary and other geometrical template upgrade processes are possible without departing from the scope of the present advancements.

Figure 4:
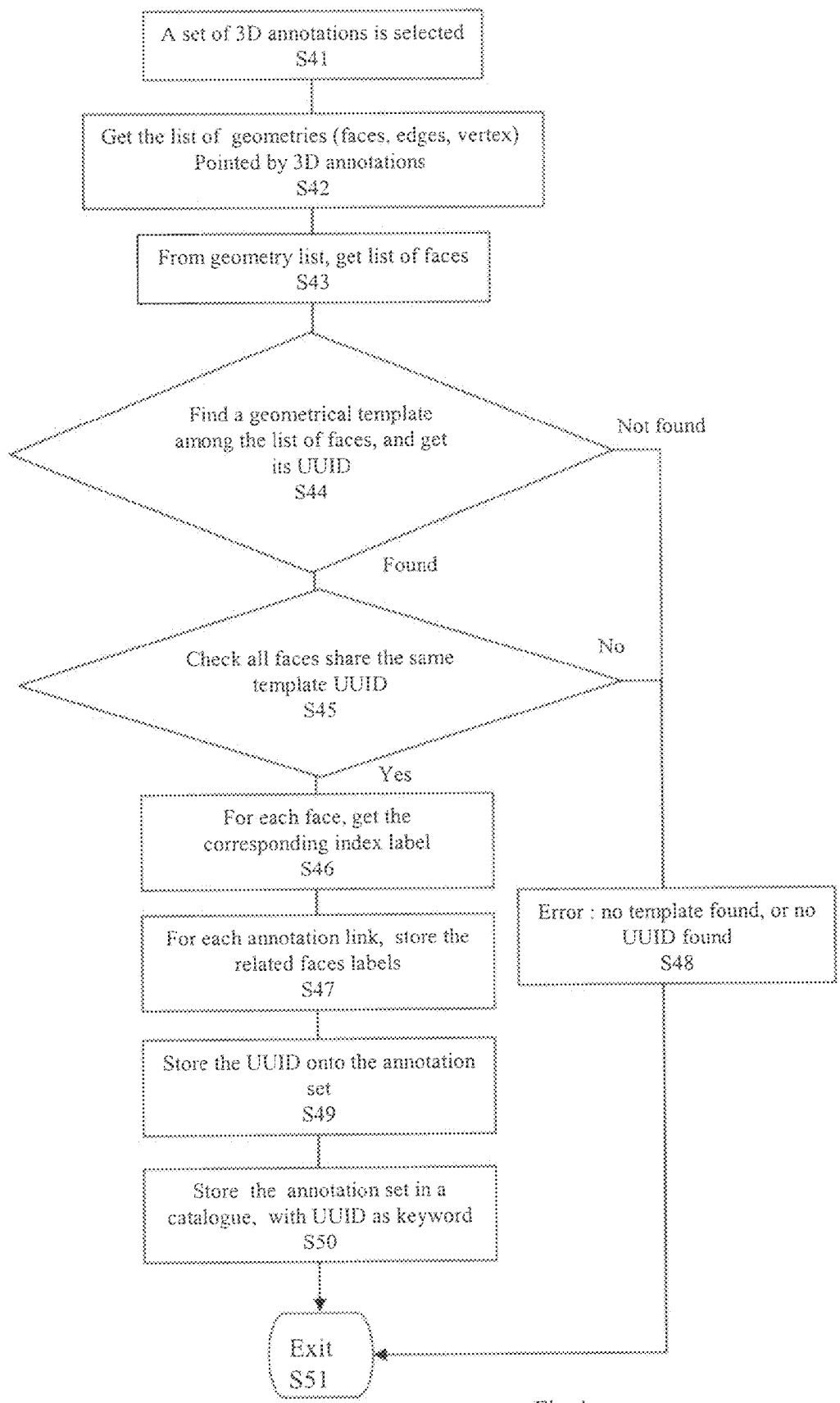
FIG. 4 is an algorithmic flowchart of creating tolerance scheme templates and cataloging the tolerance scheme templates according to an exemplary embodiment of the present advancements.

Next, a process for creating tolerance scheme templates and including the tolerance scheme templates in the catalog 15 is described with reference to FIG. 4. At step S41, a set of 3D tolerance annotations is selected. The 3D annotations selected can be selected from an existing three-dimensional model of an object, or can be created on the administrator system 14 either at the time of association with a geometrical template or beforehand.

At step S42, a list of sub-features (faces, edges and vertices) of a selected geometrical template is obtained from the set of 3D annotations. For example, the set of 3D annotations can include specifications for surface area, edge length, vertices, angles, etc. At step S43, a list of faces is derived from the list of sub-features, and at step S44, the list of faces is used to identify one matching geometrical template. That is, a geometrical template that includes one of the faces in the list is identified.

If at step S44 no geometrical templates are found for a given face on the list of faces, or if a geometrical template is found that does not have a UUID, an error message is displayed at step S48 indicating that either no geometrical template was found or that no UUID exists. The process then ends at step S51.

If at least one matching geometrical template, having a UUID, is found, the UUID for the geometrical template is read, and the process continues to step S45 where all faces on the list of faces are compared to the geometrical template to determine whether all faces correspond to that geometrical template. This involves comparing UUIDs for all faces to ensure that every face on the list returns the same UUID. If every face on the list does not return the same UUID, the process continues to step S48 to display the error message described above. Then the process ends at step S51.

If, however, all of the faces return the same UUID, the process continues to step S46 where the index value of each face, and corresponding label, is read. Then, at step S47, the index and label of each face is saved in the corresponding 3D annotation in the set of 3D annotations. At step S49 the UUID is also saved to the set of 3D annotations, and the set of 3D annotations is stored in the catalog 15 as a tolerance scheme template 13 at step S50. The UUID is used as a keyword for the tolerance scheme template 13. The process ends at step S51.

The UUID can be stored both in the tolerance scheme template itself and in a separate index file on the catalog 15 that is searchable. The tolerance scheme templates can also be wholly searchable or partially searchable, for example, only a header can be searchable. In the case where the tolerance scheme template is partially searchable, the UUID is stored in the searchable portions, such as the header. As one of ordinary skill would recognize other methods of making the UUID searchable can also be used without departing from the scope of the present advancements.

Once the geometrical templates have been upgraded, and the tolerance scheme templates have been associated therewith and stored in the catalog 15, they are ready for use at an end user system 17 to create three-dimensional models of objects that include 3D annotations. Therefore, a process for tolerancing the geometrical features of a three-dimensionally modeled object is described next with reference to FIG. 5.

Figure 5:
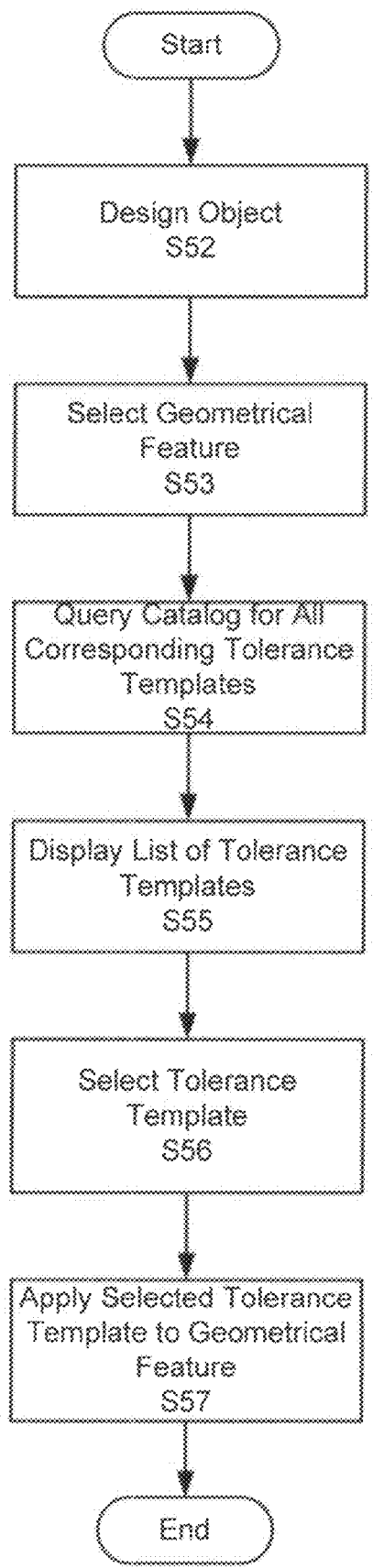
FIG. 5 is an algorithmic flowchart overview of tolerance scheme template application to a geometrical template according to exemplary embodiments of the present advancements.

In FIG. 5, the end user system 17 designs a three-dimensional model of an object at step S52. As techniques for designing and constructing a three-dimensional model of an object are known, discussion of such techniques are omitted herein for brevity. At step S53, a geometrical feature of the object is selected. At step S54, the catalog 15 is queried by the end user system 17 for all tolerance scheme templates 13 which correspond to the geometrical template including the selected geometrical feature, and the result of the query is displayed on a screen of the end user system 17.

The list of tolerance scheme templates can be displayed as a dialog box, a dropdown menu, or can be integrated into the three-dimensional modeling space. Alternatively, the list of tolerance scheme templates can be displayed on a separate window separate from the three-dimensional modeling tool. As such, the present advancements are not limited to any particular method of display a query result.

At step S56, end user system 17 selects one of the tolerance scheme templates 13. Selection of the tolerance scheme template 13 can be performed by clicking on the tolerance scheme template 13, or by entering a name of the tolerance scheme template 13 into a dialog box. The tolerance scheme template 13 can also be dragged onto the geometrical feature and/or geometrical template and dropped thereon. At step S57, the tolerance scheme template is applied to the geometrical template, and the 3D annotations of the tolerance scheme template are connected to their corresponding sub-features.

Figure 6:
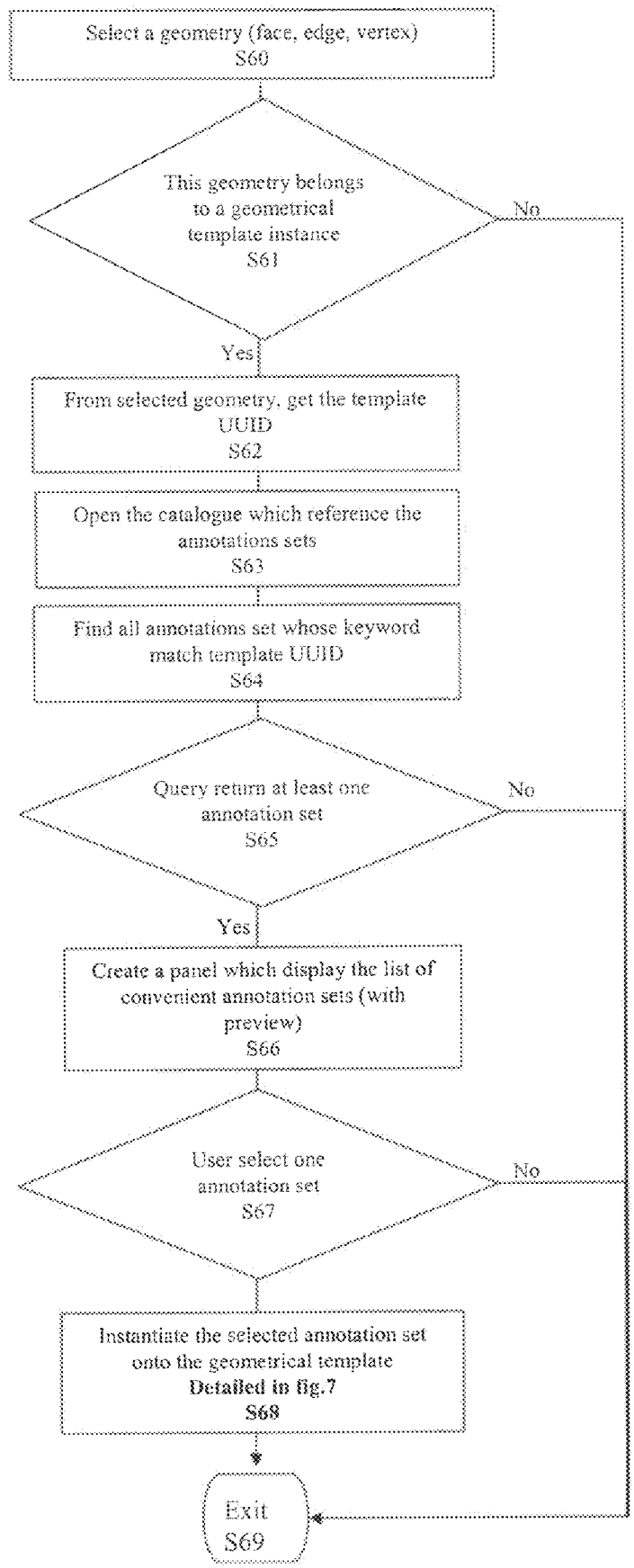
FIG. 6 is an algorithmic flowchart of tolerance scheme template selection according to exemplary embodiments of the present advancements.

Next, selection of a tolerance scheme template for instantiation on the three-dimensionally modeled object is described with reference to FIG. 6. In FIG. 6, a geometrical feature, or sub-feature, such as an edge, vertex, etc., of the three-dimensionally modeled object is selected at step S60. At step S61, the process determines whether the selected feature or sub-feature belongs to a instantiated geometrical template. If the selected sub-feature does not belong to an instantiated geometrical template, the process ends at step S69.

However, if the selected sub-feature belongs to an instantiated geometrical template, the process continues to step S62 in which the UUID of the instantiated geometrical template is extracted. At step S63, the catalog 15 is opened, and at step S64, all tolerance scheme templates 13 associated with the UUID extracted from the instantiated geometrical template are identified. At step S65, it is determined whether at least one tolerance scheme template 13 corresponding to the UUID exists. If no corresponding tolerance scheme template can be found, the process ends at step S69.

If at least one tolerance scheme template 13 is found the process continues to step S66 in which a display panel is created listing the tolerance scheme templates identified in the catalog 15. As discussed above, the panel can take any form without departing from the scope of the present advancements.

At step S67, a selection of one of the tolerance scheme templates 13 is received. If no selection is made, the process ends at step S69. If a selection is made, the selected tolerance scheme template 13 is instantiated onto the geometrical template at step S68 as described below. Then the process ends at step S69.

Figure 7:
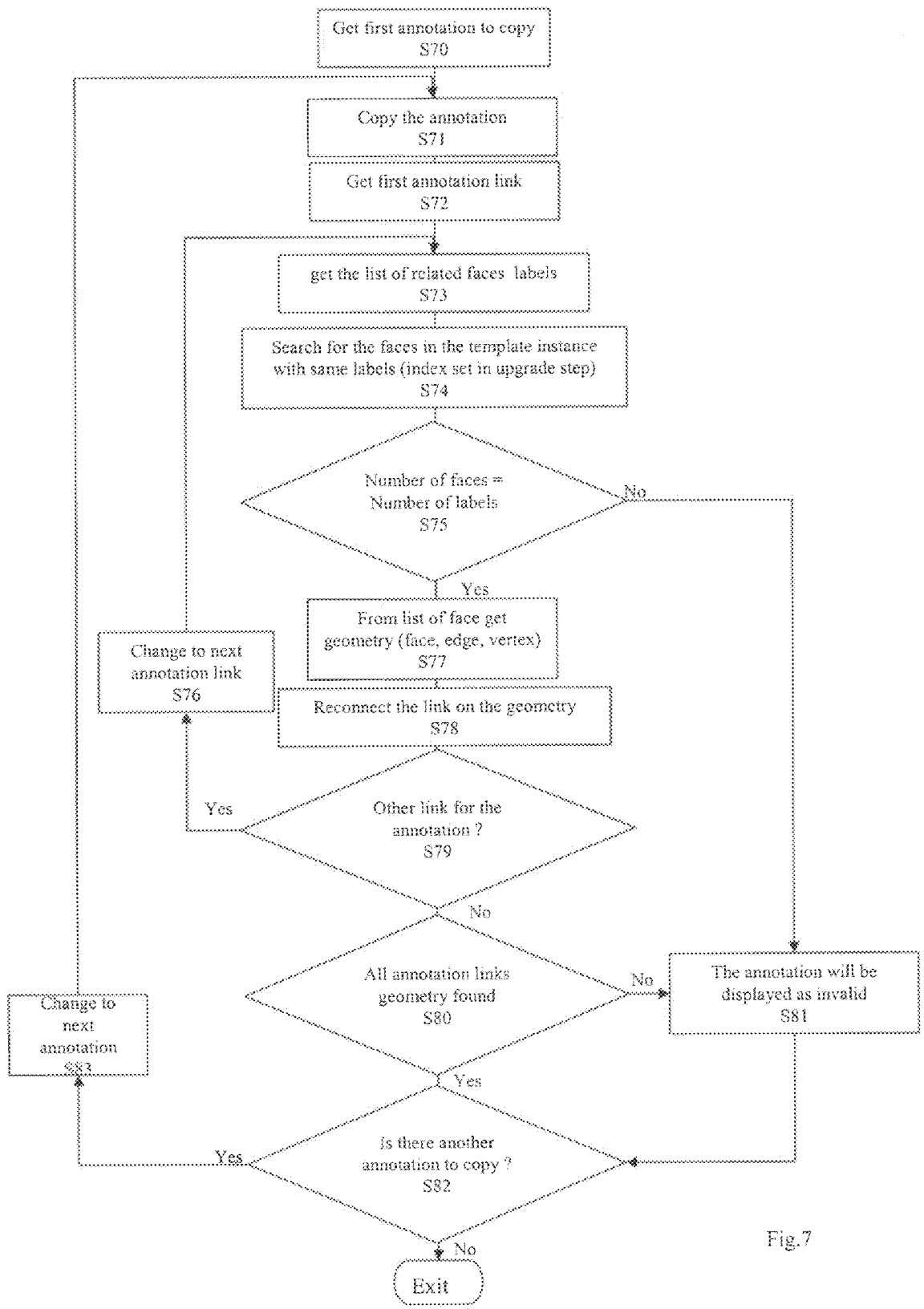
FIG. 7 is an algorithmic flowchart of tolerance scheme instantiation according to exemplary embodiments of the present advancements.

Description of instantiation of the tolerance scheme template onto a geometrical template is described next with reference to FIG. 7. In FIG. 7, the tolerance scheme template has already been selected at step S70 as discussed above. At step S71, a 3D annotation included of the tolerance scheme template is copied into memory. At step S72, an annotation link (i.e., the UUID and index) is extracted from the 3D annotation, and at step S73, a list of related faces is identified using the annotation link. At step S74, the geometrical template is searched for any of the identified faces using the UUID and index stored in the 3D annotation.

At step 75, the process determines whether for each face of the list, a matching surface exists in the instantiated geometrical template. If not, the process continues to step S81 to display the 3D annotation as invalid and then determines at step S82 whether the tolerance scheme template includes another 3D annotation. If no other 3D annotations are left in the tolerance template the process ends. However, if more 3D annotations are available, the process reverts to step S71.

If, however, at step S75 the process determines that each face in the list matches a face on the instantiated geometrical template, a list of matching sub-features (faces, edges and vertices) is obtained at step S77. At step S78 the 3D annotation is linked to a corresponding sub-feature of the instantiated geometrical template. At step S79, it is determined whether the 3D annotation has any other annotation link. If not, the process continues to step S76 where the next 3D annotation in the tolerance scheme template is selected before reverting to step S73.

If the 3D annotation has other annotation links, the process goes to S76 to search the matching sub-feature for the next annotation link. Otherwise, the process continues to step S80 to check whether a matching sub-feature has been found for each annotation link. If no matching sub-feature has been found for at least one annotation link, the process continues to step S81 to display the 3D annotation as invalid for a given link, and then continues to step S82 as discussed above.

Once a 3D annotation has been linked to all corresponding sub-features of the instantiated geometrical template, the process continues to step S82 to determine whether there are additional 3D annotations in the tolerance scheme template to be processed. If so, the process reverts to step S71. Otherwise the process ends.

Figure 8:
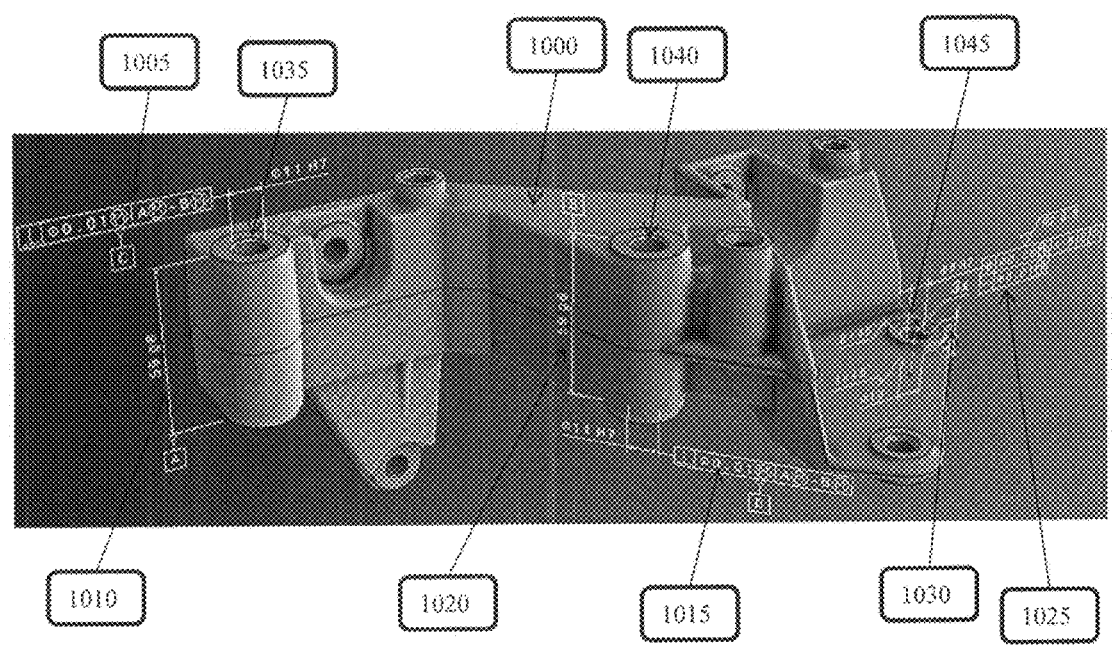
FIG. 8 is a rendering of a three-dimensionally modeled object with 3D annotations applied thereto according to exemplary embodiments of the present advancements.

FIG. 8 is an example of a three-dimensionally modeled object with 3D annotations applied thereto according to exemplary embodiments of the present advancements. In FIG. 8, the three-dimensionally modeled object 1000 includes a plurality of sub-features, such as holes 1035, 1040, 1045. Each of the holes, 1035, 1040, and 1045 have 3D annotations, such as 1005, 1010, 1015, 1020, 1025 and 1030 applied thereto as describe above to allow a designer to visualize and validate the object.

Figure 9:
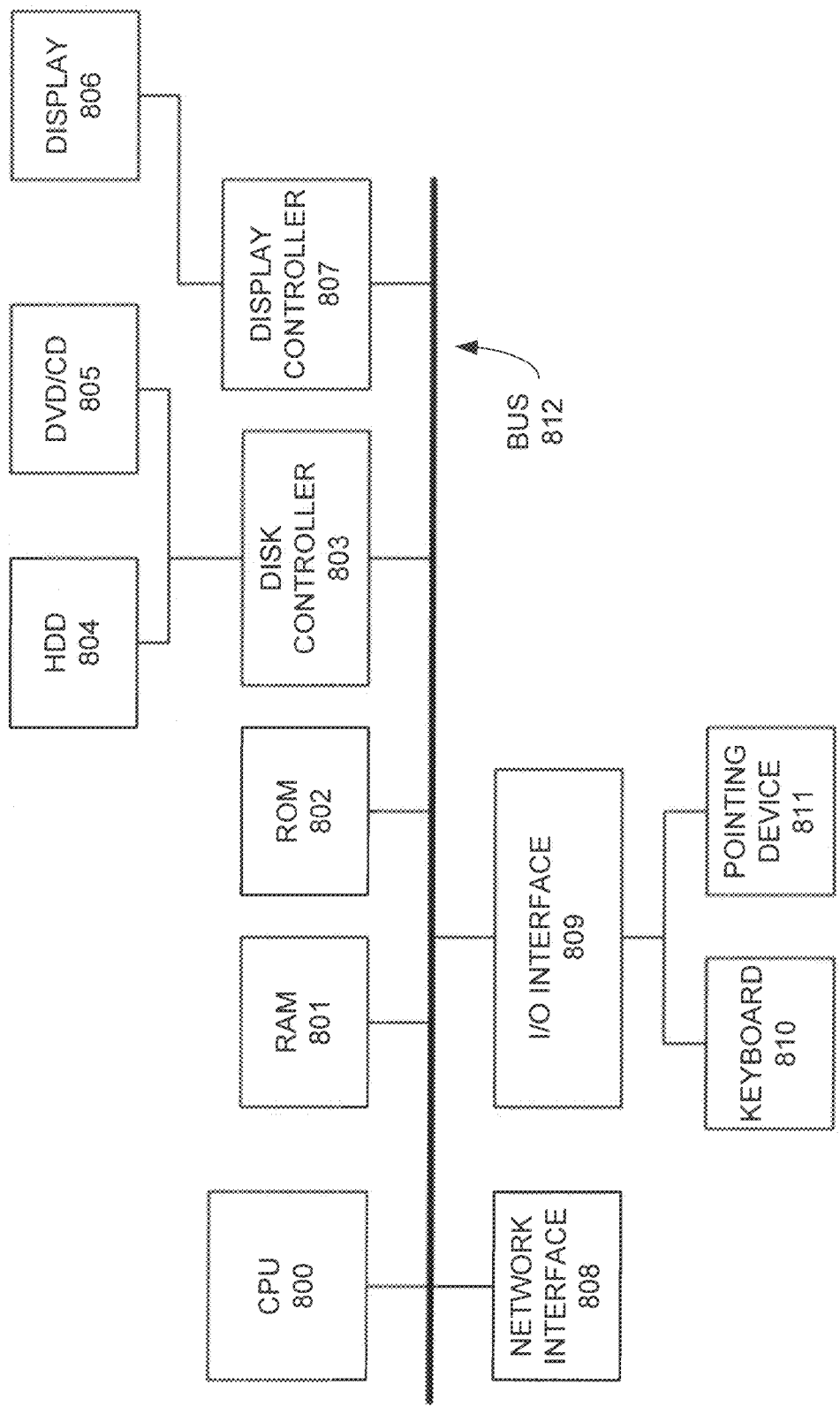
FIG. 9 is a schematic diagram of a computer aided design station according to exemplary embodiments of the present advancements.

Next, a computer aided design station according to exemplary embodiments of the present advancement is described with reference to FIG. 9. In FIG. 9, the computer aided design station includes a CPU 800 which performs the processes described above. The process can be stored as computer-readable instructions in memory, such as RAM 801 or ROM 802, or on hard disk drive (HDD) 804, DVD/CD drive 805, or can be stored remotely. Further, the claimed advancements are not limited by the form of the computer-readable media on which the computer-readable instructions of the inventive process are stored. For example, the instructions can be stored on CDs, DVDs, in FLASH memory, RAM, ROM, PROM, EPROM, EEPROM, hard disk or any other information processing device with which the computer aided design station communicates, such as a server or computer.

Further, the claimed advancements can be provides as a utility application, background daemon, or component of an operating system, or combination thereof, executing in conjunction with CPU 800 and an operating system such as Microsoft VISTA, Microsoft Windows 7, UNIX, Solaris, LINUX, Apple MAC-OS and other systems known to those skilled in the art.

CPU 800 can be a Xenon processor from Intel of America or an Opteron processor from AMD of America, or can be other processor types, such as a Freescale ColdFire, IMX, or ARM processor from Freescale Corporation of America. Alternatively, the CPU 800 can be a processor such as a Core2 Duo from Intel Corporation of America, or can be implemented on an FPGA, ASIC, PLD or using discrete logic circuits, as one of ordinary skill in the art would recognize. Further, CPU 800 can be implemented as multiple processors cooperatively working to perform the computer-readable instructions of the inventive processes described above.

The computer aided design station in FIG. 9 also includes a network interface 808, such as an Intel Ethernet PRO network interface card from Intel Corporation of America, for interfacing with a network, such as a local area network (LAN), wide area network (WAN), the Internet and the like. The computer aided design station further includes a display controller 807, such as a NVIDIA GeForce GTX graphics adaptor from NVIDIA Corporation of America for interfacing with display 806, such as a Hewlett Packard HPL2445w LCD monitor. A general purpose I/O interface 809 interfaces with a keyboard 810 and pointing device 11, such as a roller ball, mouse, touchpad and the like. Disk controller 803 connects HDD 804 and DVD/CD 805 with communication bus 812, which can be an ISA, EISA, VESA, PCI, or similar, for interconnecting all of the components of the computer aided design station. A description of the general features and functionality of the display 806, keyboard 810, pointing device 811, as well as the display controller 807, disk controller 260, network interface 808 and I/O interface 809 is omitted herein for brevity as these features are known.

Figure 10:
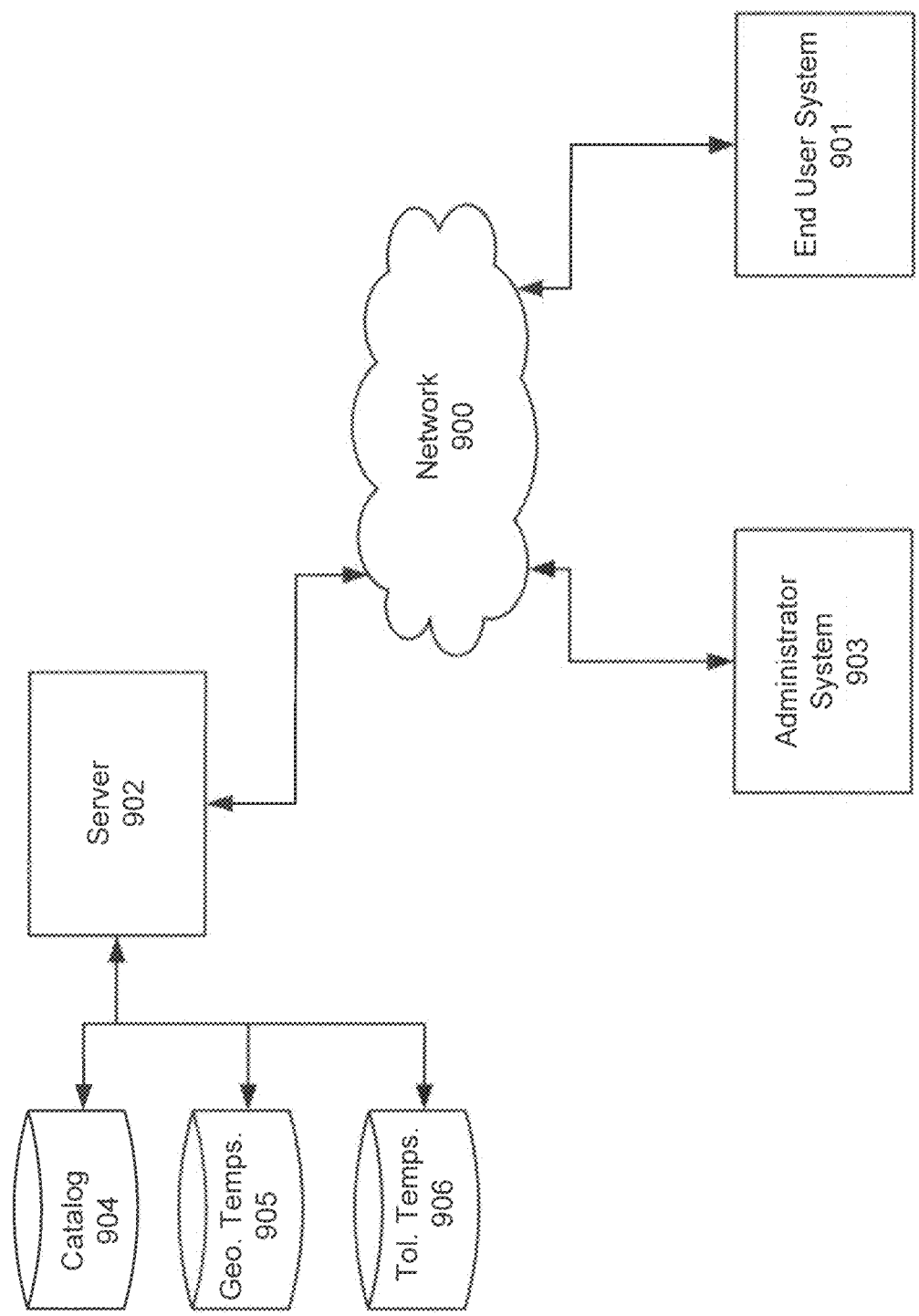
FIG. 10 is a block diagram of a computer aided design system according to exemplary embodiments of the present advancements.

FIG. 10 is a block diagram of a system for tolerancing templates according to an exemplary embodiment of the present advancements. In FIG. 10, a catalog of tolerance scheme templates 904, a catalog of geometrical templates 905 and a database of tolerance templates 906 are connected to a server 902. The server 902 is then connected to the administrator system 903 and end user system 901 via a network 900. As can be appreciated, the network 900 can be a public network, such as the Internet, or a private network such as an LAN or WAN network, or any combination thereof and can also include PSTN or ISDN sub-networks. The network 900 can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network 900 is merely exemplary and in no way limits the scope of the present advancements.

As one of ordinary skill in the art would recognize, administrator system 903 and end user system 901 can be a computer aided design station such as the one described above with reference to FIG. 9, or any other computing system that is known.

The server 902 stores the computer-readable instructions to execute the processes described above and provides these instructions via network 900 to the administrator system 903 and/or the end user system 901. The server 902 can also provide the tolerance scheme templates from the database 906, the geometrical templates from the database 905 and the template associations from catalog 904 as needed to the administrator system 903 and the end user system 901. As such, FIG. 10 includes implementations of the system via cloud computing, distributed computing and the like.

The catalog 904, geometrical templates 905, tolerance templates 906 can physically reside within a single database or can be physically separated into distinct databases located at different geographical locations or within a single building. Likewise, catalog 904, geometrical templates 905 and tolerance templates 906 can be included in server 902. Further, though only one administrator system 903 and one end user system 901 are shown, the system can support any number of administrator systems 903 and/or end user systems 901 without limitation. Similarly, multiple servers 902 and catalogs 904, geometrical template databases 905 and tolerance template databases 906 can also be implemented in the system without departing from the scope of the present advancements.

Any processes, descriptions or blocks in flowcharts described herein should be understood as representing modules, segments, or portions of code which include one or more executable instructions for implementing specific logical functions or steps in the process, and alternate implementations are included within the scope of the exemplary embodiment of the present advancements in which functions can be executed out of order from that shown or discussed, including substantially concurrently or in reverse order depending upon the functionality involved.

Numerous modifications and variations of the present advancements are also possible in light of the above teachings. It is therefore to be understood that within the scope of the appended claims, the invention can be practiced otherwise than that specifically described herein.

The invention claimed is:

1. A computer aided design station for designing and tolerancing a modeled object, comprising:
    a display to display the modeled object;
    an interface to receive a user input relating to the modeled object; and
    a processor configured to
       select a geometrical feature of the modeled object based on the user input,
       search in a catalog for tolerance scheme templates corresponding to the geometrical feature, the tolerance scheme templates specifying a geometric tolerance for the geometrical feature,
       display, on the display, tolerance scheme templates corresponding to the geometrical feature,
       select a tolerance scheme template from the displayed tolerance scheme templates based on the user input, and
       apply the selected tolerance scheme template to the geometrical feature of the modeled object,
    wherein the processor searches the catalog for the tolerance scheme templates corresponding to the geometrical feature using randomly generated universal unique identifiers that uniquely identify a geometrical template corresponding to the selected geometrical feature.

2. The computer aided design station according to claim 1, wherein the selected tolerance scheme template includes a plurality of 3D annotations specifying geometric tolerances.

3. The computer aided design station according to claim 2, wherein to apply the selected tolerance scheme the processor is further configured to
    identify, for each of the plurality of 3D annotations, corresponding sub-features of the geometrical feature of the modeled object, and
    apply each of the plurality of 3D annotations to the corresponding sub-features of the geometrical feature of the modeled object.

4. The computer aided design station according to claim 3, wherein each of the plurality of 3D annotations corresponds to one or more sub-features of the geometrical feature.

5. The computer aided design station according to claim 4, wherein the sub-features include a face, a vertex and an edge.

6. A method of adding tolerance annotations to a three-dimensionally modeled object, comprising:
    selecting a geometrical feature of the modeled object;
    searching in a catalog of tolerance scheme templates based on the selected geometrical feature, the tolerance scheme templates specifying a geometric tolerance for the geometrical feature;
    displaying tolerance scheme templates corresponding to the selected geometrical feature;
    selecting one of the displayed tolerance scheme templates; and
    applying the selected tolerance scheme template to the geometrical feature,
    wherein the searching of the catalog for the tolerance scheme templates is performed using randomly generated universal unique identifiers that uniquely identify a geometrical template corresponding to the selected geometrical feature.

7. The method according to claim 6, wherein the selected tolerance scheme template includes a plurality of 3D annotations specifying geometric tolerances.

8. The method according to claim 7, further comprising:
    identifying, for each of the plurality of 3D annotations, corresponding sub-features of the geometrical feature of the modeled object; and
    applying each of the 3D plurality of annotations to the corresponding sub-features of the geometrical feature of the modeled object.

9. The method according to claim 8, wherein each of the plurality of 3D annotations corresponds to one or more sub-features of the geometrical feature.

10. The method according to claim 9, wherein the sub-features include a face, a vertex and an edge.

11. A non-transitory computer-readable medium storing computer-readable instructions thereon, the computer readable instructions, when executed by a computer cause the computer to perform a method of adding tolerance annotations to a three-dimensionally modeled object, comprising:
    selecting a geometrical feature of the three-dimensionally modeled object;

searching in a catalog of tolerance scheme templates based on the selected geometrical feature, the tolerance scheme templates specifying a geometric tolerance for the geometrical feature;
displaying tolerance scheme templates corresponding to the selected geometrical feature;
selecting one of the displayed tolerance scheme templates; and
applying the selected tolerance scheme template to the geometrical feature,
wherein the searching of the catalog for the tolerance scheme templates is performed using randomly generated universal unique identifiers that uniquely identify a geometrical template corresponding to the selected geometrical feature.

12. The non-transitory computer-readable medium according to claim 11, wherein the selected tolerance scheme template includes a plurality of 3D annotations specifying geometric tolerances.

13. The non-transitory computer-readable medium according to claim 12, further comprising:
identifying, for each of the plurality of 3D annotations, corresponding sub-features of the geometrical feature of the modeled object; and
applying each of the 3D plurality of annotations to the corresponding sub-features of the geometrical feature of the modeled object.

14. The non-transitory computer-readable medium according to claim 13, wherein each of the plurality of 3D annotations corresponds to one or more sub-features of the geometrical feature.

15. The non-transitory computer-readable medium according to claim 14, wherein the sub-features include a face, a vertex and an edge.

16. A computer aided design station for generating a catalog of tolerance scheme templates corresponding to geometrical templates used to design a three-dimensionally modeled object, comprising:
an electronic memory to store the geometrical templates and the catalog of tolerance scheme templates;
a display to display the geometrical templates;
an interface to receive a user input; and
a processor configured to
select a geometrical template displayed on the display based on the user input,
associate a tolerance scheme template with the selected geometrical template, the tolerance scheme template including a set of 3D annotations associated with sub-features of the selected geometrical template, the 3D annotations specifying geometric tolerances for the sub-features,
append an identifier to each sub-feature in the selected geometrical template prior to association of the selected geometrical template with the tolerance scheme template,
associate each 3D annotation of the tolerance scheme template with corresponding sub-features based on the identifiers of the corresponding sub-features, and
store the tolerance scheme template in the catalog of tolerance scheme templates,
wherein the identifier of the corresponding sub-feature is generated from a randomly generated universal unique identifier of the geometrical template and an index of the corresponding sub-feature.

17. The computer aided design station according to claim 16, wherein the selected geometrical template includes a plurality of sub-features including a face, an edge and a vertex.

18. The computer aided design station according to claim 16, wherein the tolerance scheme template is associated with the selected geometrical template by including a randomly generated universal unique identifier of the geometrical template in the tolerance template.

19. The computer aided design station according to claim 18, wherein the tolerance scheme template is stored in the catalog with the randomly generated universal unique identifier of the selected geometrical template as a keyword.

20. The computer aided design station according to claim 19, wherein a plurality of tolerance scheme templates are associated with the selected geometrical template using the randomly generated universal unique identifier of the geometrical template.

21. A method of generating a catalog of tolerance scheme templates corresponding to geometrical templates used to design a three-dimensionally modeled object, comprising:
selecting a geometrical template;
associating a tolerance scheme template with the selected geometrical template, the tolerance scheme template including a set of 3D annotations associated with sub-features of the selected geometrical template, the 3D annotations specifying only geometric tolerances for the sub-features;
appending an identifier to each sub-feature in the selected geometrical template prior to association of the selected geometrical template with the tolerance scheme template;
associating each 3D annotation of the tolerance scheme template with corresponding sub-features based on the identifiers of the corresponding sub-features; and
storing the tolerance scheme template in the catalog of tolerance scheme templates,
wherein the identifier of the corresponding sub-feature is generated from a randomly generated universal unique identifier of the geometrical template and an index of the corresponding sub-feature.

22. The method according to claim 21, wherein the selected geometrical template includes a plurality of sub-features including a face, an edge and a vertex.

23. The method according to claim 21, wherein the tolerance scheme template is associated with the selected geometrical template by including a randomly generated universal unique identifier of the geometrical template in the tolerance scheme template.

24. The method according to claim 23, further comprising:
storing the tolerance scheme template in the catalog with the randomly generated universal unique identifier of the selected geometrical template as a keyword.

25. The method according to claim 24, further comprising:
associating a plurality of tolerance scheme templates with the selected geometrical template using the randomly generated universal unique identifier of the geometrical template.

26. A non-transitory computer-readable medium storing computer-readable instructions thereon, the computer readable instructions when executed by a computer cause the computer to perform a method of generating a catalog of tolerance scheme templates corresponding to geometrical templates used to design a three-dimensionally modeled object, comprising:
selecting a geometrical template;
associating a tolerance scheme template with the selected geometrical template, the tolerance scheme template including a set of 3D annotations associated with sub-features of the selected geometrical template, the 3D annotations specifying only geometric tolerances for the sub-features;

appending an identifier to each sub-feature in the selected geometrical template prior to association of the selected geometrical template with the tolerance scheme template;

associating each 3D annotation of the tolerance scheme template with corresponding sub-features based on the identifiers of the corresponding sub-features; and storing the tolerance scheme template in the catalog of tolerance scheme templates, wherein the identifier of the corresponding sub-feature is generated from a randomly generated universal unique identifier of the geometrical template and an index of the corresponding sub-feature.

27. The non-transitory computer-readable medium according to claim 26, wherein the selected geometrical template includes a plurality of sub-features including a face, an edge and a vertex.

28. The non-transitory computer-readable medium according to claim 26, wherein the tolerance scheme template is associated with the selected geometrical template by including a randomly generated universal unique identifier of the geometrical template in the tolerance scheme template.

29. The non-transitory computer-readable medium according to claim 28, further comprising:

storing the tolerance scheme template in the catalog with the randomly generated universal unique identifier of the selected geometrical template as a keyword.

30. The non-transitory computer-readable medium according to claim 29, further comprising:

associating a plurality of tolerance scheme templates with the selected geometrical template using the randomly generated universal unique identifier of the geometrical template.

\* \* \* \* \*